Patented Jan. 21, 1941

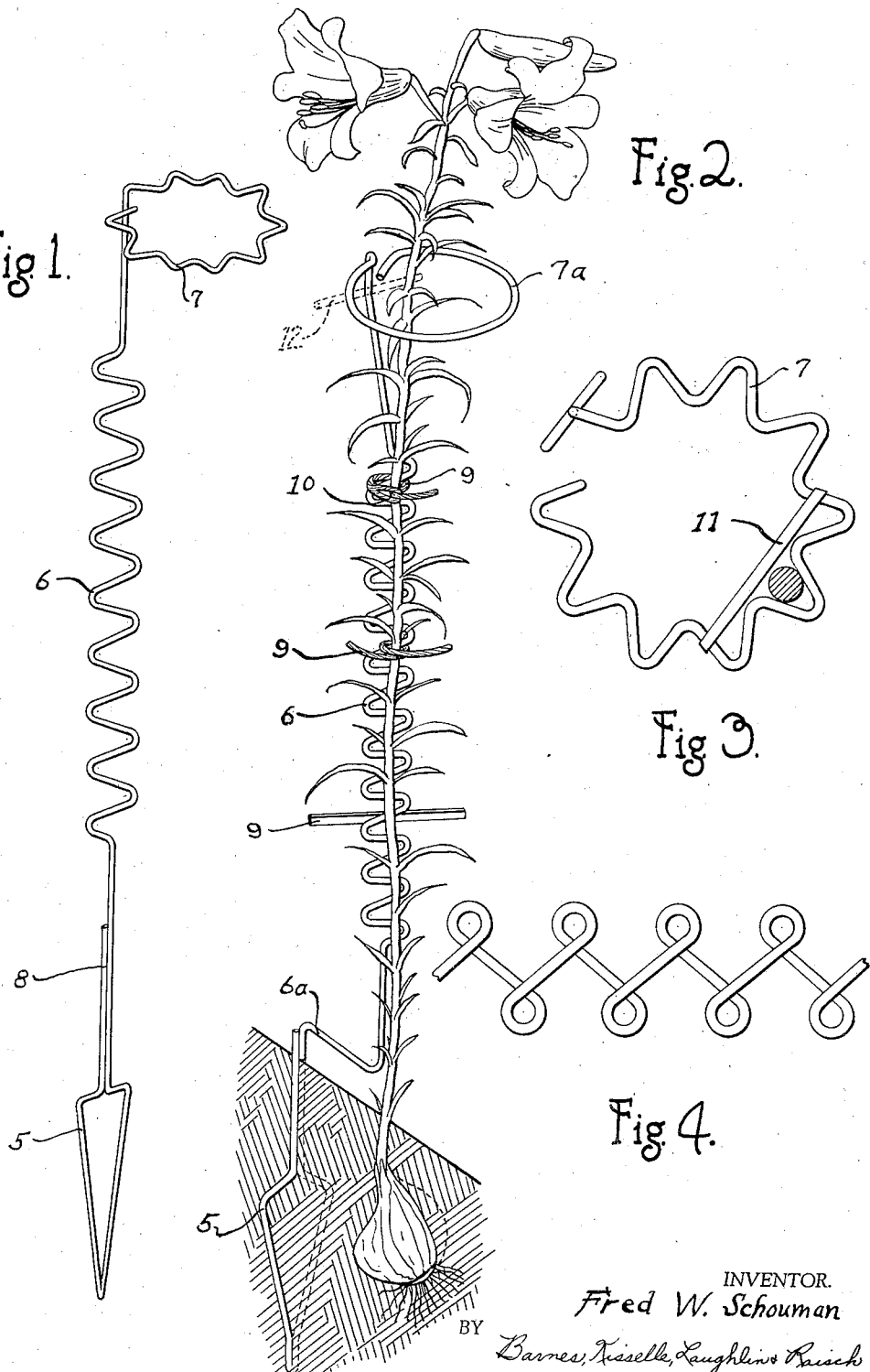

2,229,527

UNITED STATES PATENT OFFICE 2,229,527

INDIVIDUAL PLANT SUPPORT

Fred W. Schouman, Flint, Mich., assignor to Copeman Laboratories Company, Flint, Mich., a corporation of Michigan Application February 26, 1937, Serial No. 127,854

1 Claim. (Cl. 47—47)

This invention relates to a plant support and has particularly to do with a supporting means for individual long stemmed plants and flowers.

The object of this invention is to provide a plant support which is ornamental when in position and which is sufficiently flexible that, when firmly tied to the plant being supported, it will bend naturally with the plant under the influence of wind and rain or the weight of the flower or fruit of the plant. The support is designed to prevent breaking of the stem and to prevent the flower from coming in contact with the ground.

Another feature of the invention is that the portion which is adapted to be thrust in the ground is formed of more rigid material than the remainder of the support so that the bending of the support takes place above the ground level just as in the plant itself.

A further feature of the invention is its adaptability to being tied to the plant at intervals along its length so that the plant will not buckle or be injured by contact with the support as is the case with present rigid supports. The plant support is designed for very inexpensive fabrication and thus is especially adapted for use by those engaged in commercially producing long-stemmed cut flowers.

Other features of the invention will appear in the following specification and claim.

In the drawing:

Fig. 1 is a perspective sketch of the plant support.

Fig. 2 illustrates a modified form of the plant support for use with large rooted plants and also illustrates a permanent tying means to be used on the support.

Fig. 3 is a plan view of the corrugated ring of the support with a flower stem shown in cross-section.

Fig. 4 illustrates a possible modification of the corrugations.

The support is preferably made from metal wire the gauge and flexibility of which would be determined by the size of the flower or plant to be supported. In the operation of the plant support, when used, for instance, on a long stemmed flower such as a tulip, the flower and the plant support will reenforce one another making possible the use of a comparatively thin wire.

As shown especially in Fig. 1 the plant support consists generally of a foot member 5, a midsection or shaft 6, and a top ring 7. The foot member 5 may be of varying shapes, its purpose being to prevent twisting of the support when thrust in the ground. A convenient method of forming the foot member consists of simply doubling the wire back on itself and joining the end portion to the shaft by welding or soldering. This method lends itself to the formation of a reenforced or rigid portion just above the foot member as at 8, where the wire can be doubled and soldered or welded together to form a relatively stiff portion above the foot member. When the support is in the ground, the top of this rigid portion 8 should be at ground level so that all the flexing of the support will take place above the ground as is the case with plants or flower stems.

The shaft 6 of the support is preferably corrugated to facilitate tying the stem of a plant. It is necessary, that the plant or flower stems be tied to the support at several places to prevent its buckling away from the support. The corrugated shaft 6 allows the tying of the stem at several places along the shaft and prevents the bunching or slipping of the ties. The shaft 6 may also be provided with permanent tying or clamping means 9 as shown in Fig. 2. These ties are spaced along the shaft and may consist of short soft wire or metal members soldered or welded to the plant support and adapted to be wrapped around the stem of the flower to hold the same close to the shaft. If desired, one end of the soft metal ties may be looped as at 10 to provide a more convenient tying member.

The top ring 7 may be formed integrally with the shaft 6 or it may be formed separately and welded to the shaft. This top ring 7 may be formed in several different ways depending on the particular use to which it is to be put. It may be a plain open ring 7a as in Fig. 2, or it may be corrugated as shown in Figs. 1 and 3. The corrugated ring is especially adapted to a convenient fastening of a flower stem since, as shown in Fig. 3, the stem of the flower can be held within a corrugation by a ribbon or rubber band 11 or other tying means. The top ring is preferably open to allow the stem of the flower to be inserted therein. In case the flower to be supported has considerable foliage the corrugated ring is the preferred one since it will serve to evenly distribute the foliage and prevent bunching of the plant on one side of the ring. It is desirable that the corrugations both in the shaft of the support and in the ring, have a substantial depth and pitch approximating that shown in the drawing. It will be understood that the shape of the corrugations need not be limited to the simple wavy type shown in Figs. 1 to 3 but that they may be formed in other shapes, as for example, that shown in Fig. 4. The word "corrugation" as used to describe the plant supports in the specification and claim should be understood to mean any type of regular lateral displacement from the axis of the wire or other material from which the plant support is made.

In Fig. 2 a modified form of the plant support is shown wherein the shaft 6 is provided with an offset portion 6a to be located at or above the ground level. This will allow the foot 5 of the support to be inserted into the ground a short distance radially from the root of the plant, and is especially intended for use with flowers such as tulips or lilies which are tuber-propagated plants.

It will be seen that the top ring 7 or 7a might be left off and other tying or clamping means 12, shown in dotted lines, used to fasten the plant stem to the top of the support.

I claim:

In an individual plant support to be positioned upright in the ground, a foot on said support of such shape as to prevent twisting of the support when positioned in the ground, a reinforced portion above said foot to prevent flexing of the support below the ground level, a single universally flexible corrugated shaft portion above said reinforced portion, and a substantially closed corrugated ring fixed at one side to the top of said shaft, having its axis parallel to said shaft and having corrugations of substantial depth and pitch.

FRED W. SCHOUMAN.